No. 607,962. Patented July 26, 1898.
E. SEGER.
POWER TRANSMITTING ARRANGEMENT FOR COMPOUND STEAM TURBINES.
(Application filed Oct. 8, 1897.)
(No Model.) 2 Sheets—Sheet 1.

Attest
Walter Donaldson
C. S. Middleton

Inventor
Eberhard Seger
by Richards & Co
Attys

No. 607,962.

E. SEGER.

POWER TRANSMITTING ARRANGEMENT FOR COMPOUND STEAM TURBINES.

(Application filed Oct. 8, 1897.)

(No Model.)

Patented July 26, 1898.

2 Sheets—Sheet 2.

Attest
Walter Donaldson
C. S. Middleton.

Inventor
Eberhard Seger
by Richards & Co
Attys.

UNITED STATES PATENT OFFICE.

EBERHARD SEGER, OF STOCKHOLM, SWEDEN.

POWER-TRANSMITTING ARRANGEMENT FOR COMPOUND STEAM-TURBINES.

SPECIFICATION forming part of Letters Patent No. 607,962, dated July 26, 1898.

Application filed October 8, 1897. Serial No. 654,558. (No model.)

*To all whom it may concern:*

Be it known that I, EBERHARD SEGER, engineer, a subject of the King of Sweden and Norway, and a resident of 40 Kammakaregatan, Stockholm, Sweden, have invented an Improved Power-Transmitting Arrangement for Compound Steam-Turbines, of which the following is a specification.

The present invention relates to an arrangement to be applied to compound steam-turbines in which the steam acts simultaneously on two adjoining turbine wheels rotating in opposite directions for transmitting the power received by these two wheels to one shaft.

In steam-turbines the power is usually transmitted from the turbine shaft to the main shaft by means of toothed gearing, though this practice is not to be recommended, since the gear-teeth, owing to their great velocity, frequently break, rendering the motor unserviceable. For this reason the use of a belt for the power transmission is preferable, more especially as a broken belt can be replaced or repaired without appreciable expense or loss of time.

Figure 1:
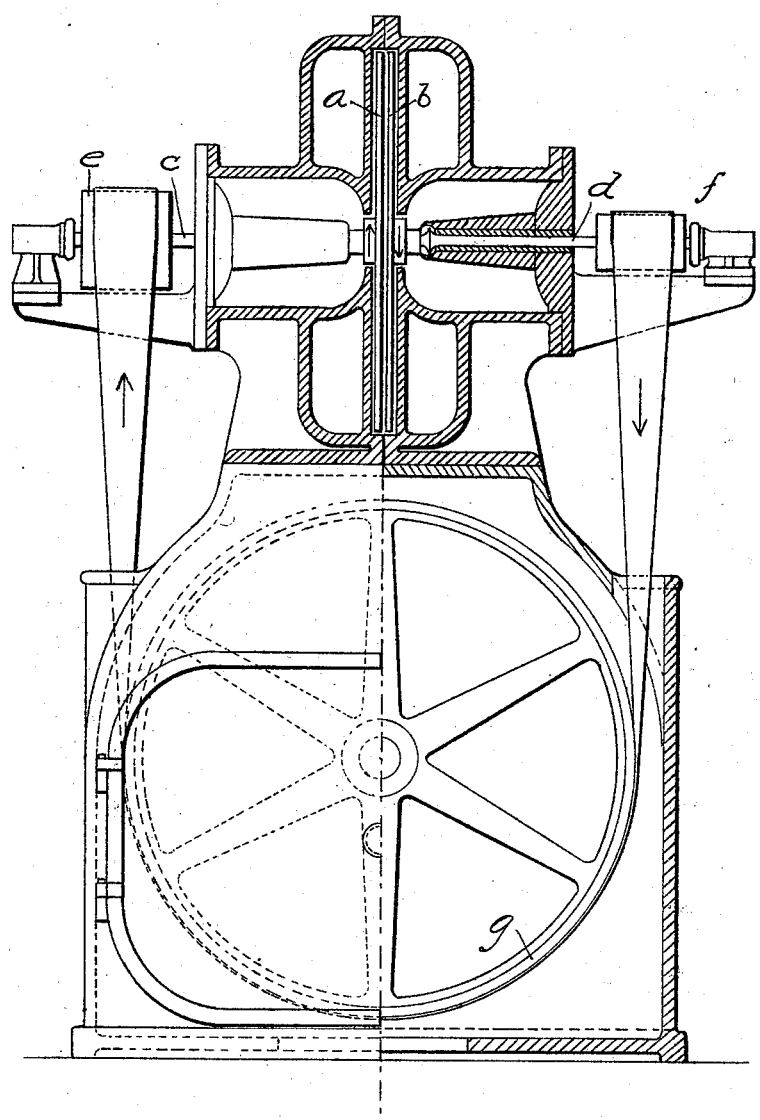
Figure 2:
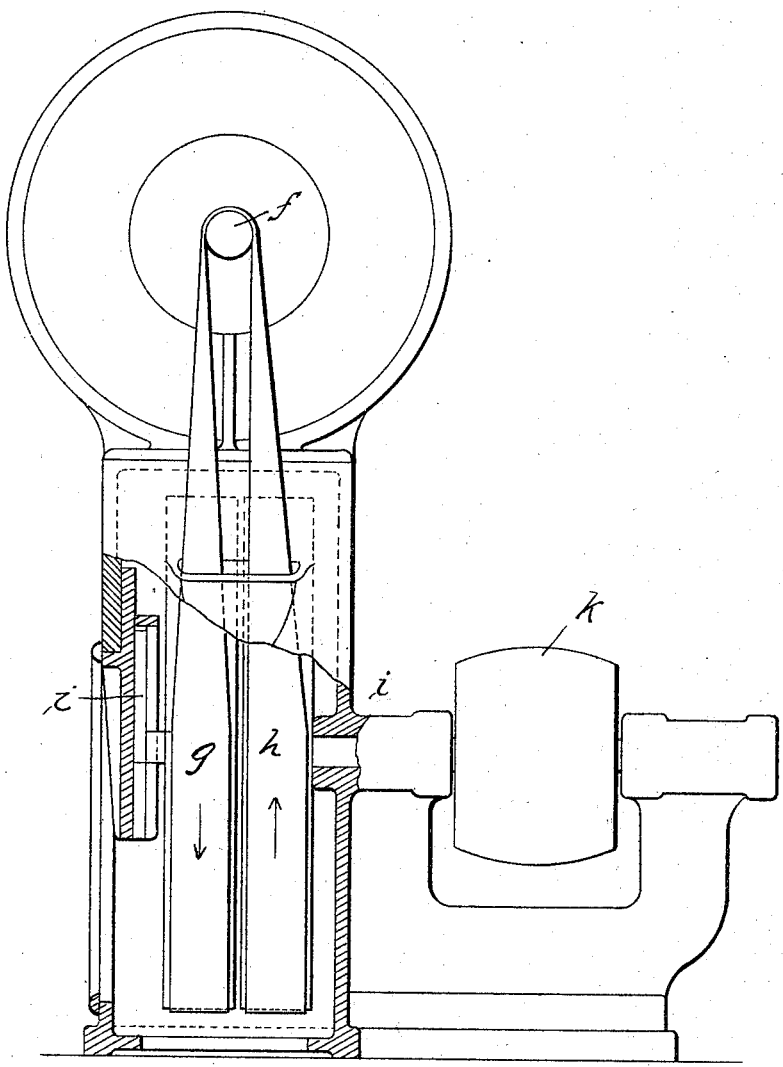

In the annexed drawings, Figure 1 illustrates a longitudinal section of a compound steam-turbine provided with the arrangement referred to; and Fig. 2, an end view, partially in section, of the same.

$a$ and $b$ are the two turbine wheels, which by the steam passing through are caused to revolve in opposite directions, as indicated by the arrows in Fig. 1. Their shafts $c$ and $d$ (which are horizontal in the turbine illustrated in the drawings) point in opposite directions, and on each of them is secured a belt-pulley $cf$ of a diameter proportioned to the respective velocities of the two turbine wheels, so as to give the same velocity to the peripheries of the two pulleys. Below these wheels there are placed two pulleys $g\ h$, one of these ($h$ in the drawings) being fixed to a shaft $i$, rotating in fixed bearings and provided with a driving-pulley $k$. The other pulley $g$, on the other hand, is secured to a short shaft, which may also be journaled in a fixed bearing, though the better plan is to journal it, as shown in the drawings, in a sliding carriage $l$, arranged in the engine-frame in such a manner that it can be moved toward or from the axis of the turbine wheels, thus retaining an even tension in the belt wrapped around the pulley $g$. When the latter is located below the turbine wheels, so as to be suspended in the belt, as in the drawings, it will maintain an even tension in the belt by virtue of its own weight. If this is not the case, the tension may be kept uniform by means of a spring or weight, tending to force the carriage, together with the pulley $g$, outward from the axis of the turbine wheels. Around the four pulleys $e$, $f$, $g$, and $h$ is wrapped a belt, passing from the pulley $f$ around the pulley $g$, then over the pulley $e$ on the same side as over $f$, and finally reaching the pulley $f$ on passing around the reverse side of the pulley $h$. By this method the power is transmitted from the turbine wheels rotating in opposite directions to the shaft $i$ and the driving-pulley attached to it. The tension required in the belt for producing the necessary friction between belt and belt-pulleys may also be brought about by means of any ordinary belt-tightener in place of using the adjustable pulley $g$.

I am aware of the fact that it has been the practice to use a single belt carried around several belt-pulleys—for instance, in drilling-machines—for the purpose of dispensing with one of the cone-pulleys usually employed for varying the speed of the machine by substituting for said cone-pulley a movable tightener-pulley, which may be adjusted according to the position of the belt on the cone-pulley, and which, in combination with a number of idler-pulleys, allows of maintaining a uniform tension in the belt. This arrangement differs, however, from that here referred to in that while in the former case the power is derived from a single belt-pulley and transmitted over a number of idler-pulleys to a cone-pulley, the power, in accordance with this invention, is derived from two belt-pulleys $e$ and $f$ and transmitted over a single idler-pulley $g$ (at the same time acting as tightener-pulley) to the belt-pulley $h$ of the driver-shaft.

Having now particularly described and ascertained the nature of my said invention and in what manner the same is to be performed, I declare that what I claim is—

In combination, the two steam-turbine wheels running with different speed and placed side by side and on shafts which project in opposite directions from the casing, the pulleys $e$, $f$, with different diameters on said shafts and the two pulleys $g$, $h$, the endless belt passed about said pulleys and also about the pulleys on the shaft ends, and one of the pulleys $g$ being supported by the belt, the other being fixed on the shaft $i$, to which the power from the two turbine wheels is to be transmitted, substantially as described.

In witness whereof I have hereunto set my hand in presence of two witnesses.

EBERHARD SEGER.

Witnesses:
H. TELANDER,
T. RISBERG.